United States Patent [19]

Bennett

[11] 3,784,093
[45] Jan. 8, 1974

[54] FACTORMATIC SLIDE RULE

[76] Inventor: Kent H. Bennett, 2724 J-3 Waiaka Rd., Honolulu, Hawaii 96814

[22] Filed: Oct. 2, 1972

[21] Appl. No.: 297,147

[52] U.S. Cl.............. 235/70 R, 235/69, 235/70 A, 235/70 B, 235/70 C
[51] Int. Cl............................................ G06g 1/02
[58] Field of Search.................... 235/70, 69, 70 A, 235/70 B

[56] References Cited
UNITED STATES PATENTS
| | | | |
|---|---|---|---|
| 1,488,686 | 4/1924 | Keuffel | 235/70 R |
| 1,250,379 | 12/1917 | Stillman | 235/70 R |
| 1,014,344 | 1/1912 | Smith | 235/70 B |

*Primary Examiner*—Stephen J. Tomsky
*Assistant Examiner*—Vit N. Miska
*Attorney*—Robert K. Rhea

[57] ABSTRACT

A slide rule extending the physical dimensions and calculating capacity of a logarithmic scale comprising a frame having start-answer index lines at its respective ends slidably supporting a slider having one or more scales adjacent one longitudinal side. The slider is longitudinally scored across its remaining transverse width to define a plurality of longitudinal parallel lines extending between transverse end limits respectively coinciding with the indexes. A logarithmic scale, equal in length with the combined length of the plurality of parallel lines, is equally divided to form a like plurality of logarithmic scale segments, which are progressively scored on the plurality of parallel lines. A cursor, supported by the frame, includes a scale line number calculator for determining the magnitude and location of a calculated result.

4 Claims, 11 Drawing Figures

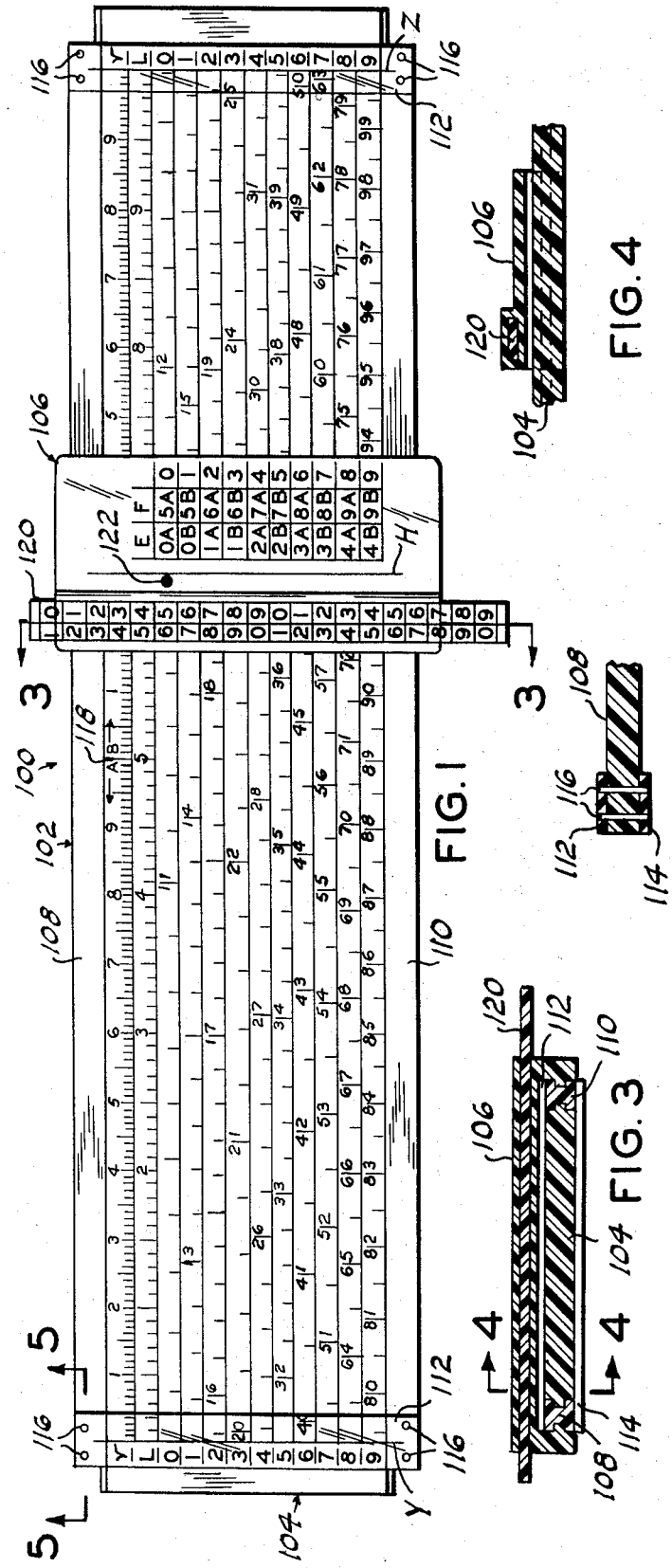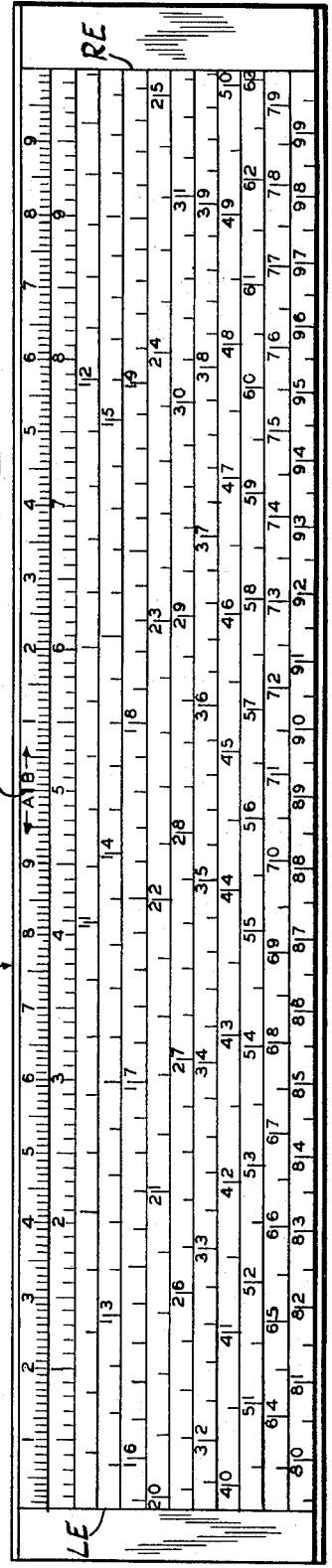

FACTORMATIC SLIDE RULE

BACKGROUND OF THE INVENTION

1. Field of the Invention

The present invention relates to slide rules and more particularly to a slide rule effectively lengthening a logarithmic scale without increasing the length of the instrument containing the scale.

It is generally understood with linear slide rules the longer the overall length of the rule or the greater the diameter of the rule, in circular slide rules, the more accurate will be the interpolations of significant figures and the ability to determine additional estimated figures. The accuracy in each case depending upon the ability of the user. The most popular side rule is known as the "10 inch" slide rule for the reason that it is a convenient size for carrying or storing and that the scales provided thereon are of sufficient size and spacing to assure reasonable accuracy. Many longer length slide rules are available where greater accuracy is required but, because of their size, are not generally used except in laboratories, or the like. Although more accurate interpolation and easier reading can be effected by a reasonable increase in the length of a logarithmic scale it must be increased 10 fold to increase the calculating capacity by one significant figure throughout the scale, therefore, logarithmic scale calculators heretofore have generally been confined to the 10 inch slide rule.

2. Description of the Prior Art.

U.S. Pat. No. 3,286,920 discloses an elongated slide rule formed of flexible material so that the rule may be rolled up for storage when not in use.

This invention is distinctive over this patent and conventional slide rules by increasing the significant figure calculating capacity by placing an elongated logarithmic scale on a plurality of lines successively scored longitudinally on the slider without an increase in longitudinal dimenison of the slide rule.

SUMMARY OF THE INVENTION

This invention comprises a frame having a start-answer or index line transversely scored across its respective end portions. The frame slidably receives a slider having end lines transversely scored on its surface at its respective end portions coinciding with the index lines. Scale indicia is scored on the slider unit at one longitudinal side between the slider end lines. The remaining transverse width of the slider is longitudinally divided by a plurality of equally spaced-apart scale lines parallel with the longitudinal sides of the slider and between its end lines. Each scale line is assigned a value or scale line number to distinguish it from the remaining scale lines.

A cursor extends transversely across the slider and is supported by the frame for registering with the indexes and linear values on the slider. The cursor includes a cross hair or hairline parallel with the index lines and increments of indicia for registering with the values on the slider. The cursor slidably supports a movable scale line calculator comprising an elongated strip extending across the slider and frame for locating the scale line containing a calculated value. The line calculator contains a repeating series of indicia, respectively, equal in value to the values assigned to the respective scale lines on the slider.

The principal object of this invention is to provide a means for increasing the significant figure and estimated figure accuracy calculating capacity of a slide rule by lengthening a logarithmic calculating scale without lengthening the longitudinal dimension of the slide rule the logarithmic scale is placed on.

BRIEF DESCRIPTION OF THE DRAWINGS

FIG. 1 is a top view of the slide rule;

FIG. 2 is a top view of the slider unit, per se;

FIG. 3 is a vertical cross-sectional view, to a larger scale, taken along the line 3—3 of FIG. 1;

FIG. 4 is a vertical cross-sectional view taken along the line 4—4 of FIG. 3;

FIG. 5 is a fragmentary vertical cross-sectional view taken along the line 5—5 of FIG. 1;

DESCRIPTION OF THE PREFERRED EMBODIMENT

Figure 6A:
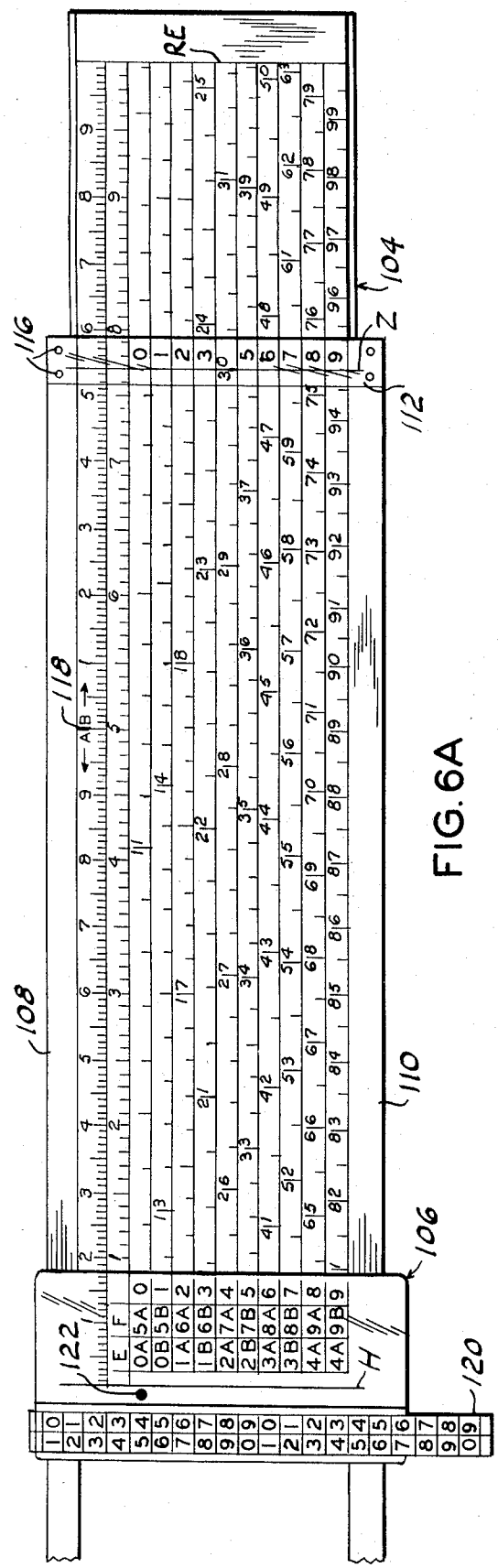
FIGS. 6A and 6B illustrate an example of multiplication.

Like characters of reference designate like parts in those figures of the drawings in which they occur.

In the drawings:

Numerals and increments of the scales normally appearing through overlying transparent components of the slide rule have generally been omitted for clarity.

The reference numeral 100 indicates the slide rule, as a whole, comprising a support or frame 102, a scale member or slider 104 and a cursor 106. The frame 102 is substantially conventional with linear slide rules comprising elongated side members 108 and 110 joined in parallel spaced-apart relation at their respective ends by preferably transparent upper and lower bars 112 and 114, respectively, which are secured at their respective end portions to the respective frame side members 108 and 110 by pins 116. The upper bars 112 are longitudinally marked or scored medially their width to define startanswer or index lines Y and Z adjacent the respective left and right ends of the frame, as viewed in the drawings. The slider 104, having a length slightly greater than the length of the frame 102 for ease in manipulation and a width coextensive with the spacing between the frame members 108 and 110, is cooperatively received therebetween in conventional tongue and groove fashion. The slider 104 is provided, adjacent its respective left and right end portions, with a transverse scored or printed line coinciding with the spacing between the index lines Y and Z, as indicated at LE AND RE, respectively. The slider 104 is longitudinally scored between its end lines LE and RE to form a plurality of longitudinally extending parallel segments or spaces filling the transverse width of the scale for receiving scale indicia, as presently explained. The longitudinal space on the slider, adjacent its marginal edge facing the frame side 108, is provided with a square root scale, indicated by the square root symbol, and comprising a repeating series of indicia with assigned values with the central portion of the scale being indicated by a division point 118 with the letter A indicating the series of indicia to the left of the division point 118, as viewed in the drawings and indicated by the arrow, while the letter B is placed on the opposite or right side of the division point 118 with the arrow indicating the second repeating series of indicia for the purposes presently explained. The longitudinal spacing on the slider 104, adjacent the square root scale, is provided with a log scale L comprising indicia with assigned values extending throughout the length of the scale L in equally spaced-apart relation with every tenth increment being assigned a value. It should be noted that the spacing of the increments forming the log line L bear a relationship to the increments forming the square root scale such that the spacing between any two increments of the log line is equal to twice the spacing between any two increments of the square root scale. Stated another way, each increment of the log scale L is aligned, transversely of the slider, with every other one of the increments forming the square root scale.

The remaining spaces, extending longitudinally of the slider between its end lines LE and RE and occupying the remaining transverse width of the slider, equal 10 in number in the example shown, and are assigned values, such as the numerals 0 through 9, printed on the respective frame end members 112 for identification of these segments or spaces which are hereinafter referred to as "scale lines." A logarithmic scale, equal in length to the log scale L, is increased 10-fold in length and divided into ten segments, each equal in length to the spacing between the end lines LE and RE of the slider with these ten segments of the logarithmic scale having the increments thereof scored on the respective scale lines numbered 0 through 9. Selected increments, each equaling the value of the extended logarithmic scale, are assigned identical values on the respective scale lines, such as by using the numerals 11 through 99 in sequence. It should be understood that the value at the slider right end line RE of any one of the scale lines, numbered 0 through 9, is the identical value of the logarithmic scale at the slider left end line LE beginning the succeeding scale line. For example, the value at the end of the scale line numbered 0 is the identical value at the end line LE of the second scale line numbered 1 and so on ending with the scale line 9.

The preferably transparent cursor 106 overlies and extends transversely of the frame 102 and slider 104 and is slidably supported, at its respective ends, by the respective outer lateral surfaces of the frame members 108 and 110 by substantially conventional cooperating tongue and groove joints so that the cursor may move from one index of the frame to the other index. Because of the structural arrangement of the components the undersurface of the cursor overlying the slider and frame is preferably spaced slightly above the slider and frame side members a distance sufficient to permit the cursor to slide over or overlie the respective frame end member 112 for the purposes readily apparent.

The cursor is provided with a hairline H extending transversely of the frame and slider perpendicular with respect to the longitudinal direction of the scales longitudinally scored or printed on the slider. A column of scale line values, identical with the scale line values 0 through 9, is printed or scored on the cursor along one marginal edge in alignment with and overlying the respective scale lines for ease in identifying a particular scale line during calculation as hereinafter explained.

The opposite side or marginal edge of the cursor, extending transversely across the frame and slider, is provided with a longitudinally extending slot or opening for slidably receiving a line calculator 120. In the example shown, the line calculator 120 comprises an elongated rectangular strip of material having sufficient rigidity to permit its being manually moved longitudinally through its surrounding slot in a to and fro action across the frame and line calculator. The slider 120 is longitudinally divided by a centrally scored line and transversely scored or marked throughout its length in equal spaced relation with respect to the scale line positions of the logarithmic scale lines numbered 0 through 9 for receiving a repeating series of values equal to the 10 scale lines, such as the numerals 1 through 0, which are scored or printed on the upper surface of the line calculator at one side of its longitudinal dividing line while a repeating series of the value 10 l, such as the numerals 0 through 9, are placed on the opposite or right side of the line calculator dividing line, as viewed in the drawings, for obtaining the number of the scale line on which a value or unknown quantity being calculated will be found as hereinafter explained.

A scale line reference point, such as the circular dot 122, is marked on the upper surface of the cursor at one side of the hairline H and in overlying position with respect to the scale line numbered 0 for the purposes presently explained.

The scale lines numbered 0 through 9, having the logarithmic scale indicia scored thereon similarly bear a definite relationship to the log line L.

Two basic concepts relating to logarithmic scales are: (*a*) the circularity of logarithmic scales and (*b*) the use of relative logarithmic distance and relative reciprocal logarithmic distance in calculation. The circularity of logarithmic scales is attested by a circular slide rule and by anology a table of logarithms. Circularity means that a small addition to the highest value on the scale will result in the lowest and conversely, a small substration from the lowest value on the scale will result in the highest. With a table of logarithms, the mantissas (logarithmic values) behave in this manner, whereas the characteristic shows the actual increase or decrease in value.

The relative logarithmic distance hereinafter referred to as "distance" of the value on the slider is the distance between the left end line LE of the first scale line numbered 0 and the value. The relative reciprocal logarithmic distance hereinafter referred to as "reciprocal distance" of a value on the slider is the distance between the right end line RE of the last scale line numbered 9 and the value. Movement to the right with this slide rule is equivalent to addition of distance or reciprocal distance and movenet to the left is equivalent to substration of distance or reciprocal distance. In anology with a table of logarithms, multiplication is accomplished by the addition of distance or the substraction or reciprocal distance and division is accomplished by the subtraction of distance or the addition of reciprocal distance as more fully explained by examples hereinbelow.

Disregard the decimal point in the mantissa and consider a four place table of logarithms as simply 10,000 places. The log scale L contains 100 equally spaced increments or places. Estimating 10 places between any two increments results in 1,000 estimated places. The positions of the increments on the extended logarithmic scale are plotted to equal 0 to 1,000 places on the scale line numbered 0 and 1,000 to 2,000 places on the scale line numbered 1 and so on through scale line numbered 9. It, threfore, seems evident that the mantissas for all values on line numbered 1 start with the number 1. Thus, when one of the indexes Y or Z or the hairline H is aligned with a value on one of the scale lines the indicator will simultaneously be aligned with the same value on the log scale L. Therefore, the number of scale lines employed, to contain the extended logarithmic scale, must be contained an even number of times in the desired total of marked and estimated places of the extended logarithmic scale. It seems obvious, in the example illustrated, that additional logarithmic value indicating increments may be added between any two increments shown on the respective scale lines for increased accuracy.

Thus, the mantissa of a logarithmic value may be obtained by the position of one of the indicators, such as the hairline H, positioned over the selected value on one of the scale lines of the logarithmic scale and reading the value of the indicia on the log line L. As is well known, the square root of a given number may be obtained by dividing the characteristic and logarithm of that number by two and obtaining the antilog from a log table which is accomplished by this slide rule by locating the value of the numeral on the log scale L and then using the square root scale for placement of the indicator to read the resulting root on one of the logarithmic scale lines in the manner more fully explained hereinbelow.

Let $C$ equal the characteristic of a given value and $M$ the mantissa of that value. This can be expressed as $C/2 + M/2$ (1). Let $D$ represent the distance of a given value. Substituting $D$ for $M$ in formula (1) results in $C/2 + D/2$ (2). If the characteristic of the given value is 0, as in 4.0, formula (2) becomes $D/2$ (3). Any whole number in formula (2) may be cancelled for the reason any whole number would be a characteristic. Thus, if a given value has an even characteristic, such as 4, formula (2) becomes $4/2 + D/2$ or $2 + D/2$, then cancelling out 2 as it is a whole integer, results in $D/2$ above. If the characteristic is an odd number, such as 5 formula (2) becomes $5/2 + D/2$ or $2\ 1/2 + D/2$. Cancelling out 2 results in $1/2 + D/2$ (4). The 1/2 or 0.5 is a mantissa and represents 1/2 of the total distance of the slide rule scale. Thus, for values which have an even numbered characteristic or a characteristic of zero, the formula is $D/2$ or the distance of the value divided by 2. If the characteristic of the value is odd, the formula is $1/2 + D/2$ or the distance of the value divided by 2 plus 1/2 the total distance of the slide rule scale.

The drawings illustrate a slide rule having 10 logarithmic scale lines, and 1/2 the total distance is five scale lines. In the drawings, where N is a value with an even characteristic or a characteristic of zero, $\sqrt{10N}$ will be at the same position between the scale end lines as $\sqrt{N}$ but five scale lines down. If any odd numbered scale line is divided by two the result is a fractional remainder of 1/2. This is 1/2 a scale line. Therefore, the answer position will be in section B of the square root line. Therefore, two additional columns of square root location indicators are placed on the cursor and indicated by E and F so that these two columns of values contain the scale line values numbered 0 through 9 and also either the left or right square root scale A or B, as viewed in the drawings, are included in the respective columns E and F for determining which section of the square root scale is to be used and on which scale line the result will be found. The number-letter sets in column E, for even numbered or zero characteristics, for each scale line number is obtained by dividing that line number by two and substituting A for no remainder and B for a remainder of 1/2. The number-letter sets in column F for odd numbered characteristics, is obtained by adding five to the column E for each scale line number.

The present invention involves use of some of the techniques employed in manipulating a conventional slide rule. For example, in a conventional slide rule indicia relating to quantities or numerical values are included on a pair of elements slidably mounted with respect to each other with the indicia generally displayed in the form of logarithmic scales extending between end llimits called indexes at the beginning and end of the scales. The conventional slide rule also includes a transparent cursor containing a hairline. As set forth hereinabove in this invention all of the scales are placed on the slider between end limits forming indexes which coincide with end limits or indexes scored on the respective end portions of the slider supporting frame.

For the most part manipulation of this slide rule in performing multiplication, division, etc. will be readily understood by one accustomed to performing numerical calculations on a conventional slide rule.

MULTIPLICATION

Figure 6B:
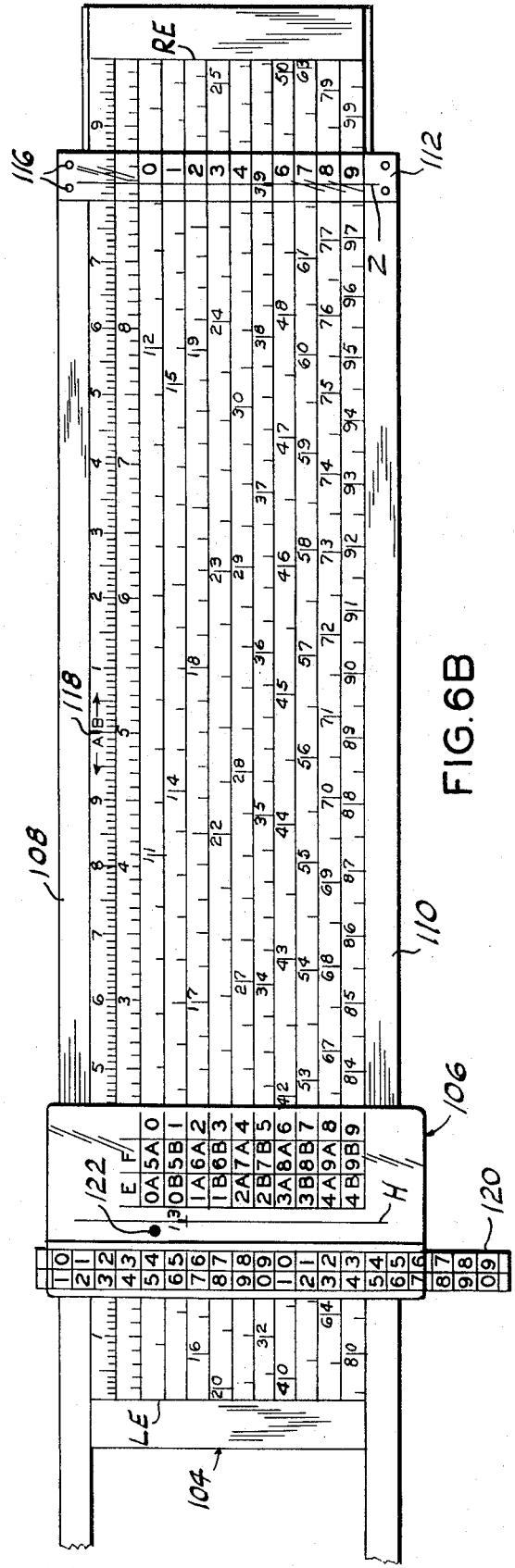

An example of multiplying 3 times 13, accomplished by adding distances, is illustrated by FIGS. 6A and 6B. The frame index Z is placed over the value 3, (shown as 30 on the scale line numbered 4). The line calculator 120 is moved within its slot to position the numeral 4, on the right side of the calculator, so it is horizontally aligned with the indicator dot 122 (because only the numbers on the right side can be immediately next to the indicator dot 122). The cursor 106 is then moved so its hairline H coincides with the slider end line LE while maintaining the slider stationary with respect to the frame sides 108 and 110. The slider 104 is then moved so that the numeral 13 on the slider is positioned under the hairline H (FIG. 6B). The scale line on which the numeral 13 is on may be seen to be aligned with the value 5 on the right side of the line calculator 120, which side corresponds with the right index line Z that is over the scale. This numeral 5 is the key for locating the scale line or distance along the logarithmic scale on which the answer will be found which appears under the frame end line Z as 39 on the scale line numbered 5. Multiplying other selected values one with the other proceeds in an identical fashion wherein the magnitude of the unknown value, or in other words, on which the scale line the unknown value will be found, is determined by the line calculator in positioning the line number on which the selected starting numeral is located in alignment with the indicator dot so that the line number of the second multiplier, aligned with a numeral on the line calculator indicates the scale line number on which the product is located. Obviously, right or left end lines on the frame and slider are employed in such calculations as in conventional slide rules.

In the above example it will be readily apparent that the number of the scale line on which the product is found is the total of the scale line numbers of the multiplier and multiplicand. This is true if the number of complete scale lines equaling the distance to the multiplier is added to the number of complete scale lines equaling the distance to the multiplicand (if the sum of the partial distances to the multiplier and multiplicand is less than the full distance of one scale line). Therefore, if the right index line Z is on the slider 104 at the time a multiplier or multiplicand is under the hairline H, in normal multiplication of two values, the correct scale line number on which the product is found is obtained by simply adding the scale line numbers.

However, consider multiplying 18 by 3. The initial setting of the slide rule will be identical to the setting shown by FIG. 6A wherein the value 3 is located under the right index line Z and the hairline H is positioned over the left end line LE. The slider 104 is then moved so that the value 18 is aligned under the hairline H, not shown. This moves the left index line Y over the slider 104 so that it is simultaneously aligned with the product 54. Adding scale line numbers 2 plus 4 equalling 6 in this example would be incorrect for the reason the product is actually on scale line number 7. Therefore, if the left index line Y is over the slider 104 at the time a multiplier or multiplicand is under the hairline H, in the normal course of multiplication, an additional scale line must be added to the sum of the numbers corresponding to the scale lines the multiplier and multiplicand are on. The line calculator 120 accomplishes this function as may be observed in FIG. 6A where scale line number 7 (in the left column of repeating series of scale line numbers) is aligned with the scale line on which the value 18 is located. The line calculator is particularly useful in determining the correct scale line number on which the product or quotient will be found during chain multiplication and/or division.

In chain calculations the scale line number on which the product or quotient was located becomes the next starting scale line number of the line calculator which is positioned adjacent the indicator dot 122 as explained hereinabove.

Conversely, it will be readily apparent that FIGS. 6A and 6B illustrate dividing 39 by 13 in which the index Z is placed over the value 39 and the hairline H is placed over the value 13 (FIG. 6B). The slider is then moved so that its end line LE coincides with the hairline H so that the index Z is then located over the value 3.

DIVISION

Figure 7A:
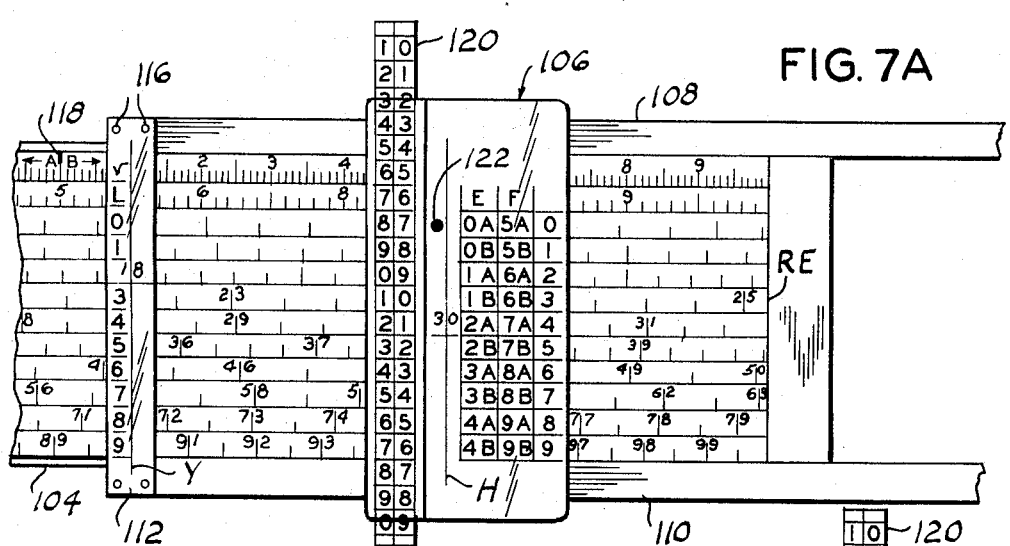
FIGS. 7A and 7B illustrate an example of division.
Figure 7B:
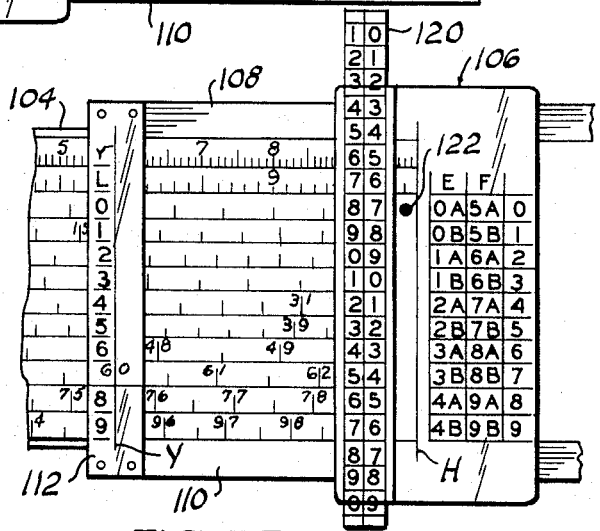

An example of dividing 18 by 3, accomplished by substracting distances, is illustrated in FIGS. 7A and 7B. The left index line Y is placed over the numeral 18 on the slider (FIG. 7A). The cursor 106 is moved so that its hairline H is over 3 (or 30) on the slider. Since the numeral 18 is located on scale line numbered 2, the line calculator 120 is moved so that the number 2, on the left side of the line calculator, is aligned with the value 3 (or 30) (FIG. 7A). (The left side of the line calculator is used for the reason that the left index Y is over the scale lines). The numeral adjacent the indicator dot 122, on the line calculator, is 7 thus indicating that the result of dividing 18 by 3 will be found on the scale line numbered 7 on the slider. Either the left end line LE or the right end line RE is then moved to coincide with the hairline H, in either case the opposite index Y or Z is then over the numeral 6 (or 60) on scale line number 7. In this example the right end line RE was aligned with the hairline H.

Similarly, FIGS. 7A and 7B illustrate an example of multiplying 3 by 6 in which the index Y is positioned over the value 6 the hairline H is positioned to coincide with the right end line RE (FIG. 7B). The slider 104 is then moved so that the value 3 is aligned with the hairline H with the product 18 appearing under the index Y.

LOGARITHMS

Figure 8A:
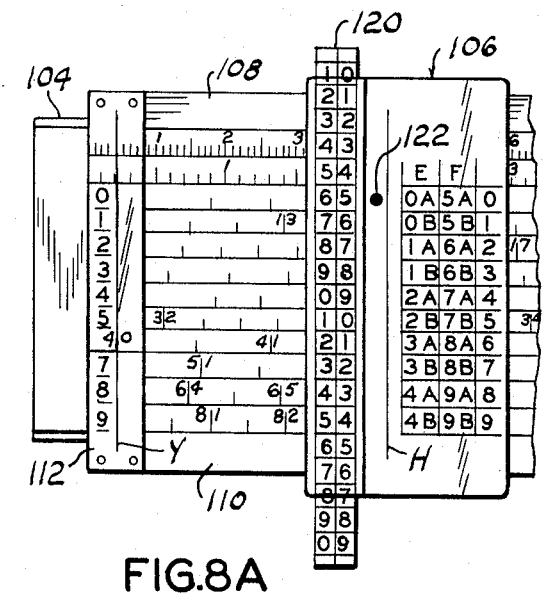
FIGS. 8A and 8B illustrate an example of obtaining a logarithm mantissa and a root of a value.

The mantissa of a value is obtained by using the scale lines 0–9 in combination with the log scale L by the relationship set forth hereinabove. For example FIG. 8A illustrates the manner in which the logarithm of 4 (or 40) is obtained. The left index Y is aligned with the numeral 4 (or 40) on the slider. The value on the log line L under the index Y may be seen as 021 by estimating the value one. Since the numeral 4 (or 40) is on scale line number 6, indicating that the total distance or six complete scale lines preceeds the value 4, the numeral 6 becomes the first figure of the mantissa to which the value on the log line is attached for completing the mantissa 6021 of 4(or 40).

OBTAINING THE SQUARE ROOT OF A VALUE

Figure 8B:
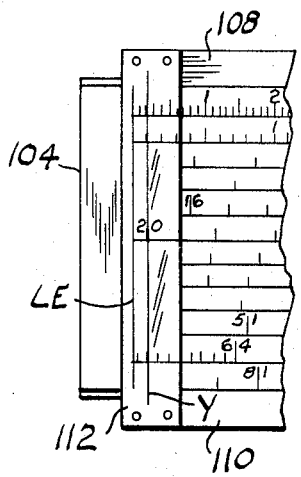

FIGS. 8A and 8B illustrate the example of obtaining the square root of 4 (or 40). The left index Y is positioned over the value 4 (or 40) on scale line numeral 6 as explained hereinabove.

In the column of values E on the cursor the value cooperating or horizontally aligned with the scale line numbered 6 is the value 3A which indicates, as explained hereinabove, that the square root of 4 will be found on scale line numbered 3 in section A of the square root scale. The left index Y is moved to coincide with the value 021 in section A of the square root scale. The index Y is then over the value 2 on scale line numbered 3. The same setting of the index Y also provides the square root of 40 by noting that in the column F on the cursor the value horizontally aligned with the scale line 6, on which the value 40 is located, is 8A indicating that the square root of 40 will be found on scale line number 8 in section A of the square root scale. The index Y may be seen to be over the value 632 on scale line number 8 (FIG. 8B). Locating the decimal, thus 6.32, results in the square root of 40.

It seems readily apparent that cube roots of values may be similarly obtained by this slide rule by the addition of a cube root scale divided into three equal sections with the total length of the three sections coextensive with the log scale L and keyed with other columns similar to the cursor columns E and F for locating the cube root section and scale line number.

Obviously the invention is susceptible to changes or alterations without defeating its practicability, therefore, I do not wish to be confined to the preferred embodiment shown in the drawings and described herein.

I claim:

1. A slide rule, comprising:
   a frame including side members joined at their respective end portions in parallel spaced relation by an end member,
   each said end member having an index line scored thereon transversely of said frame;
   a slider slidably supported by said side members for movement longitudinally of said frame,
   said slider having an end line scored on its respective end portion in cooperative simultaneous registerable relation with respect to the end member index lines,
   said slider having indicia thereon located in a predetermined order and at a predetermined spacing, said indicia corresponding to quantitative parameters and comprising a logarithmic scale, said logarithmic scale being divided to form a plurality of segments of equal length extending longitudinally between the end lines of said slider in parallel juxtaposed progressive relation forming a like plurality of scale lines;

and, means cooperating with said frame and said slider for aligning a first selected quantitative parameter with a second selected quantitative parameter producing an indication of an unknown quantitative parameter and its magnitude, said means including a cursor slidably supported by said frame for longitudinal movement therealong, said cursor having a hairline extending transversely of said frame and having an indicator scored thereon, said indicator overlying the position of said scale line containing the lowermost values of said logarithmic scale, and, scale line calculator means on said cursor and cooperating with said indicator for determining which scale line of said plurality of scale lines contains the unknown quantitative parameter, said scale line calculator means including a rectangular strip supported by said cursor for to and fro movement transversely of said frame, said strip having a repeating series of indicia scored thereon with the value of each series of the repeating series of indicia corresponding to the numerical value of the plurality of scale lines when consectively numbered transversely of said slider, the spacing between the indicia of each repeating series of indicia being such that each indicia coincides with the position of one of the scale lines of said plurality of scale lines when one of said repeating series of indicia is disposed in overlying relation with respect to said plurality of scale lines.

2. The slide rule according to claim 1 in which the predetermined order and spacing of said indicia further includes:

a log scale comprising a single series of values scored on said slider between its end lines.

3. The slide rule according to claim 2 in which the predetermined order and spacing of said indicia further includes:

a root scale comprising a repeating series of values scored on said one slider between its end lines.

4. The slide rule according to claim 3 and further including :

scale line and root value locating indicia scored on said cursor transversely of said slider in overlying aligned relation with respect to said plurality of scale lines.

* * * * *